United States Patent Office 3,462,948
Patented Aug. 26, 1969

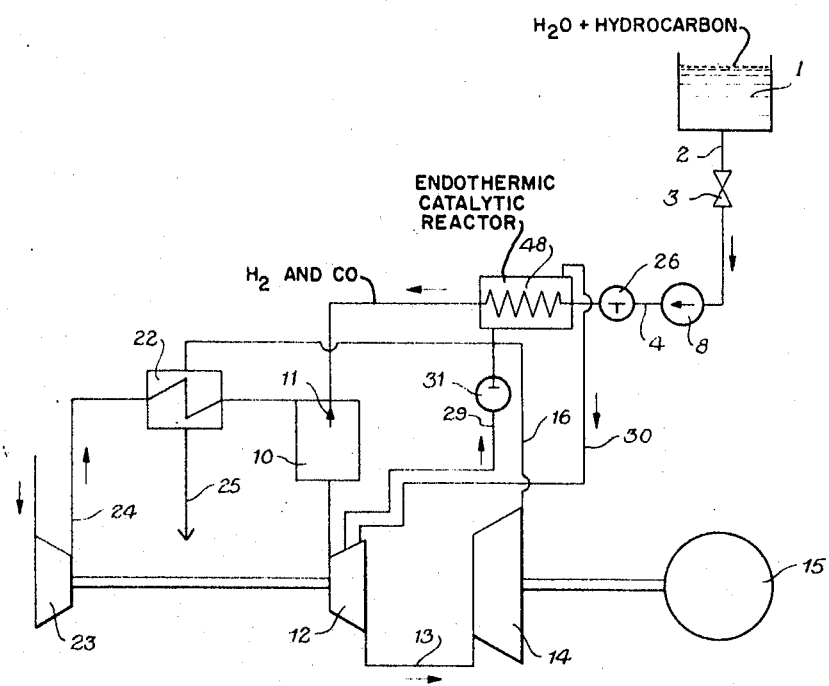

3,462,948
CONTINUOUS FLOW COMBUSTION ENGINE
Norbert Scholz, Kottgeisering, Germany, assignor to M.A.N. Turbo GmbH, Munich-Allach, Germany
Filed Sept. 25, 1967, Ser. No. 670,060
Claims priority, application Germany, Sept. 27, 1966, M 71,072
Int. Cl. F02c 3/22
U.S. Cl. 60—39.02                    1 Claim

ABSTRACT OF THE DISCLOSURE

Hydrocarbon fuel and water are mixed and endothermically reacted to form a gaseous fuel composed of carbon monoxide and water. This gaseous fuel is burned and the combustion gases used to drive a turbine. A portion of the partially expanded combustion gases is taken from between two turbine stages and used to supply the sole heat needed for endothermically reacting the hydrocarbon fuel and water.

---

The U.S. patent to Scholz, No. 3,334,486, discloses a combustion engine such as a gas turbine plant in which the initial hydrocarbon fuel is endothermically reacted with water before being sent to the combustion chamber. This purely endothermic process causes a continuous effective conversion of a liquid or gaseous hydrocarbon fuel when mixed with water to carbon monoxide and hydrogen in a liquid or vapor phase and by means of the reaction heat. The gas thus produced is supplied to the combustion chamber of the engine with the required reaction heat being obtained from a heat exchanger. The aforesaid patent discloses that the reaction heat is partly obtained from the turbine after the gas has been partially expanded between two turbine stages and at a temperature level as low as possible but still high enough for carrying out the endothermic reaction. A portion of the heat required for the endothermic reaction is taken from the exhaust gases from the plant in order to make up the total heat requirement.

However, under some circumstances, a combustion engine must operate in such a way that it is impossible to obtain heat energy for the endothermic reaction from the engine exhaust gases.

The object of this invention is to improve upon the aforesaid patent and obtain the heat for the endothermic fuel reaction in such a way that no heat is taken from the engine exhaust gases. This condition may be due to the fact that the amount of heat remaining in the exhaust gases is too small to be utilized with any advantage or because the exhaust gas heat is required for other purposes.

In this invention, the amount of heat required for the endothermic heat reaction is supplied solely by being taken off between the turbine stages.

The means by which the objects of the invention are obtained are described more fully with reference to the accompanying schematic drawing shown a gas turbine power plant with gases taken from between turbine stages.

As shown, both reaction components which are in the form of a hydrocarbon/water emulsion and solution are fed from a tank 1 through a pipe 2 and a shut-off valve 3 to a pump 8. The mixture of hydrocarbon fuel and water is then pumped through pipe 4 through a valve 26 and into a heat exchanger 48. In this heat exchanger, a mixture of hydrocarbon fuel and water is converted into carbon monoxide and hydrogen as produced by the prevailing equilibrium conditions which are a function of pressure, temperature, mixture ratio and catalyst type. Then the carbon monoxide and hydrogen mixture which contains more or less water vapors and fuel vapors and sometimes small quantities of reaction by-products goes into a combustion chamber 10 where it is ignited by a burner nozzle 11 and is decomposed with the aid of atmospheric oxygen to carbon dioxide and water vapor. Then the combustion gases flow to a compressor turbine 12 functioning as a high pressure turbine and which is joined to a free-power turbine 14 via a hot gas pipe 13. There is no mechanical shaft coupling between turbine 12 and 14. Turbine 14 is the low pressure turbine of the plant and is mechanically coupled to a motor, such as a generator 15.

The exhaust gases of turbine 14 are sent through a pipe 16 to a heat exchanger 22. These exhaust gases serve to preheat the intake air being delivered to combustion chamber 10 by air compressor 23 and through air intake pipe 24. This preheating represents an increase in heat recovery. These exhaust gases from heat exchanger 22 are then discharged into the atmosphere through pipe 25. High pressure turbine 12 mechanically drives air compressor 23.

The reaction heat required for the endothermic reaction in heat exchanger 48 is taken solely from a portion of the combustion gas being expanded in high pressure turbine 12 as between two stages thereof or it can be tapped off between two stages of turbine 14. This hot partially expanded gas from turbine 12 flows through pipe 29 and valve 31 into heat exchanger 48 and is returned through pipe 30 into turbine 12. Valve 31 controls the amount of hot gas supplied to heat exchanger 48.

Having now described the means by which the objects of the invention are obtained, I claim:

1. In a process for generating power in a power plant having a combustion engine including a combustion chamber wherein fuel is burned and the resulting hot products of combustion are used as the working fluid for the engine, such as a gas turbine, and in which hydrocarbon fuel is mixed with water in a proportion such that in the presence of heat substantially all of said hydrocarbon fuel and at least part of said water will be converted to hydrogen and carbon monoxide, said mixture of hydrocarbon fuel and water being heated at least partially to an endothermic reaction by heat from the turbine to form a gaseous fuel containing hydrogen and carbon monoxide having a higher heat content than said hydrocarbon fuel, said gaseous fuel being burned in said combustion chamber to produce hot combustion gas, and passing the hot combustion gas into said engine for actuating said engine, the improvement comprising supplying the sole external heat for said endothermic reaction from partially expanded combustion gas taken from between two stages in the turbine at a temperature as low as possible but high enough to effect entirely said endothermic reaction.

References Cited
UNITED STATES PATENTS
3,334,486   8/1967   Scholz _____ 60—39.02

FREDERICK KETTERER, Primary Examiner